(12) United States Patent
Seki

(10) Patent No.: US 7,350,855 B2
(45) Date of Patent: Apr. 1, 2008

(54) VEHICLE WATER DRAINAGE STRUCTURE

(75) Inventor: Hiroshi Seki, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 12 days.

(21) Appl. No.: 11/480,550

(22) Filed: Jul. 5, 2006

(65) Prior Publication Data

US 2007/0007797 A1 Jan. 11, 2007

(30) Foreign Application Priority Data

Jul. 6, 2005 (JP) ............................. 2005-197269

(51) Int. Cl.
*B60R 27/00* (2006.01)
(52) U.S. Cl. .................................... 296/208
(58) Field of Classification Search .................. 296/38, 296/208
See application file for complete search history.

(56) References Cited

U.S. PATENT DOCUMENTS 1,053,795 A * 2/1913 Ellis ............................ 296/38
6,582,012 B1 * 6/2003 Smith .......................... 296/208
7,156,439 B2 * 1/2007 Bejin et al. ................. 296/37.1
2003/0137164 A1 * 7/2003 Schickel et al. ............. 296/208

FOREIGN PATENT DOCUMENTS

JP 2004-291948 10/2004

* cited by examiner

*Primary Examiner*—Dennis H Pedder
(74) *Attorney, Agent, or Firm*—Global IP Counselors, LLP

(57) ABSTRACT

A water drainage structure is provided to prevent drainage water from getting on hot components inside the engine compartment and suppress the occurrence of evaporation noise. At least one water drainage opening is provided in a bottom portion of a vehicle member arranged on the under surface of a floor panel of a vehicle. The downstream end portion of a water drainage pipe is arranged to communicate with the inside of a closed cross sectional structure formed by the floor panel and the vehicle member. Drainage water from a vehicle device flows out of the downstream end portion of the water drainage pipe and is discharged to the outside of the vehicle through the water drainage openings of the vehicle member. As a result, the drainage water is prevented from getting on hot components inside the engine compartment of the vehicle and the occurrence of evaporation noise is suppressed.

17 Claims, 5 Drawing Sheets

US 7,350,855 B2

VEHICLE WATER DRAINAGE STRUCTURE

CROSS-REFERENCE TO RELATED APPLICATIONS

This application claims priority under 35 U.S.C. § 119 to Japanese Patent Application No. 2005-197269. The entire disclosure of Japanese Patent Application No. 2005-197269 is hereby incorporated herein by reference.

BACKGROUND OF THE INVENTION

1. Field of the Invention

The present invention relates to a vehicle water drainage structure.

2. Background Information

Japanese Laid-Open Patent Publication No. 2004-291948 discloses a vehicle water drainage structure a conventional structure for discharging drainage water from an air conditioner provided in a vehicle to an engine compartment of the vehicle.

Such conventional vehicle drainage structure is, for example, configured to vaporize the air conditioner drainage water and discharge the vapor to the outside of the vehicle when the ambient temperature inside the engine compartment is above a prescribed temperature. The vaporization is accomplished by spraying the air conditioner drainage water into a space above a heat source inside the engine compartment.

In view of the above, it will be apparent to those skilled in the art from this disclosure that there exists a need for an improved vehicle water drainage structure. This invention addresses this need in the art as well as other needs, which will become apparent to those skilled in the art from this disclosure.

SUMMARY OF THE INVENTION

It has been discovered that, in the conventional vehicle water drainage structure in which the air conditioner drainage water is sprayed into a space above a heat source inside the engine compartment and vaporized, there are times when a portion of the drainage water does not vaporize completely. When such un-vaporized drainage water gets on hot components (e.g., exhaust system components), a noise is emitted as the drainage water evaporates and it is possible for the driver to mistakenly identify the evaporation noise as a problem with the vehicle.

Accordingly, one object of the present invention is to prevent drainage water from getting on hot components inside the engine compartment and suppress the occurrence of evaporation noise.

In order to achieve the above stated object and other objects of the present invention, a vehicle water drainage structure includes a vehicle member and a water drainage pipe. The vehicle member is configured and arranged to form a closed cross sectional structure with a bottom surface of a floor panel of a vehicle when the vehicle member is mounted to the floor panel. The vehicle member includes a water drainage opening in a bottom portion thereof. The water drainage pipe has an upstream end portion coupled to a vehicle device and a downstream end portion passing into inside of the closed cross sectional structure formed by the floor panel and the vehicle member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
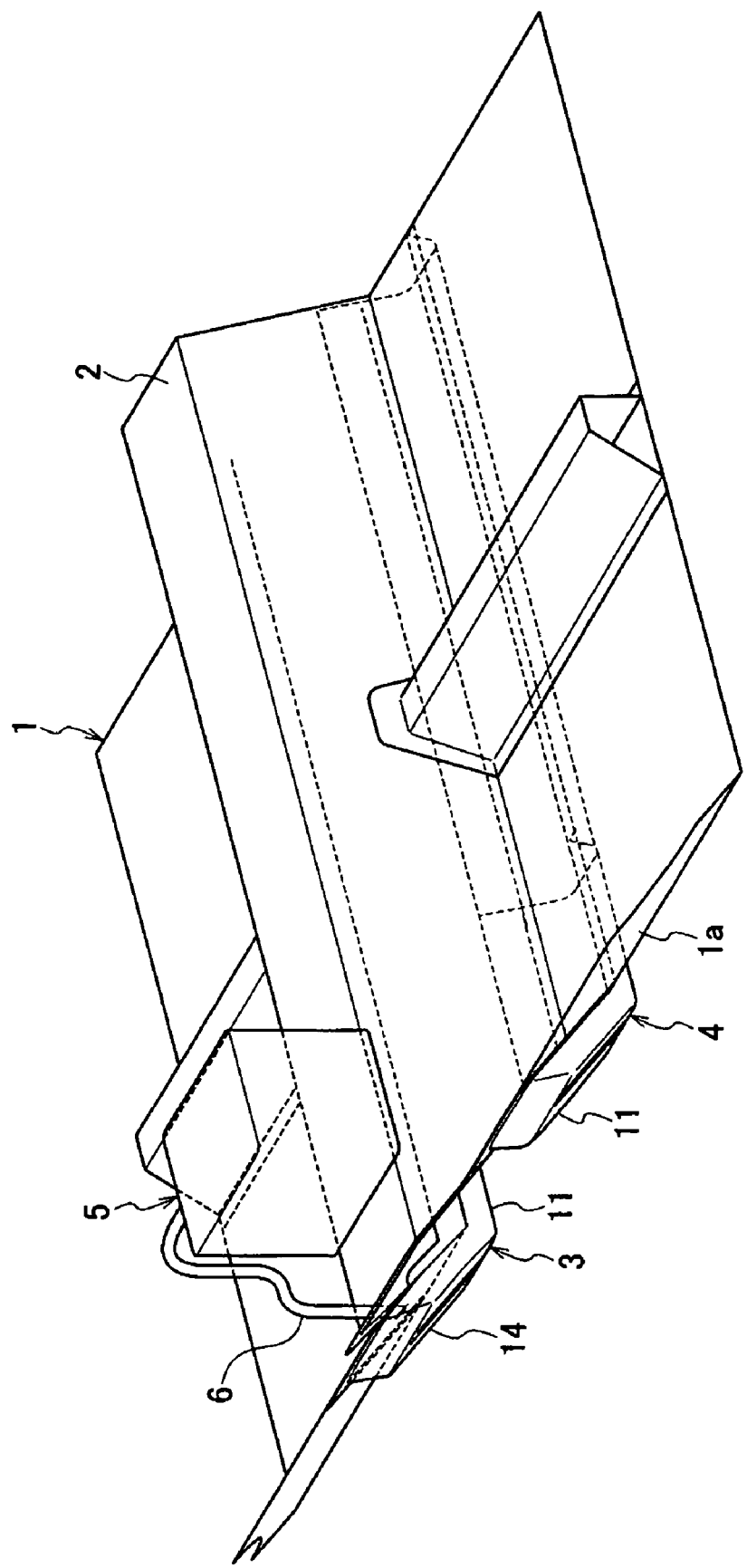
FIG. 1 is a perspective view of a vehicle water drainage structure taken from a position diagonally above and in front of the structure with respect to a vehicle in accordance with one embodiment of the present invention.
Figure 2:
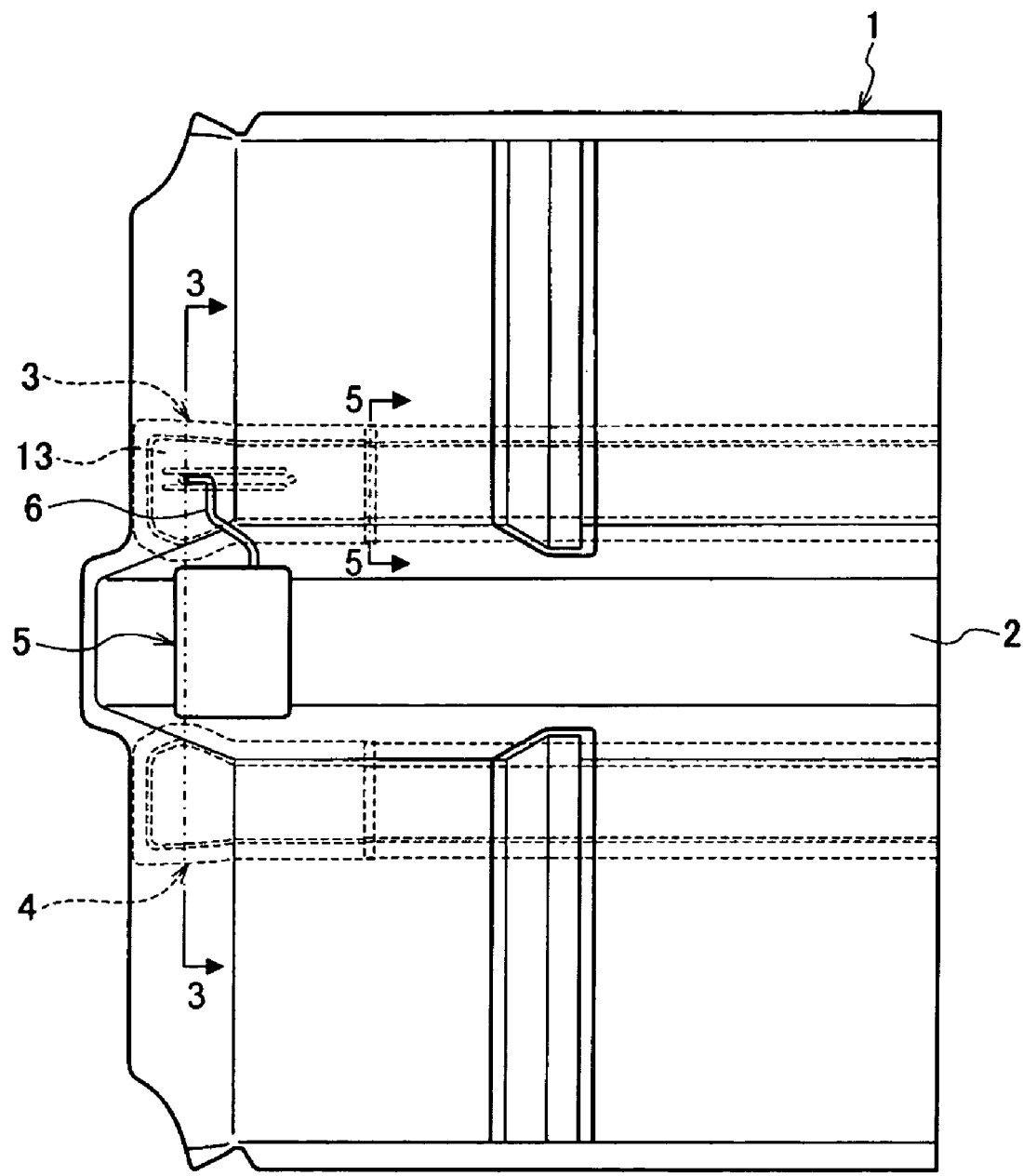
FIG. 2 is a top plan view of the vehicle water drainage structure in accordance with the embodiment of the present invention.
Figure 3:
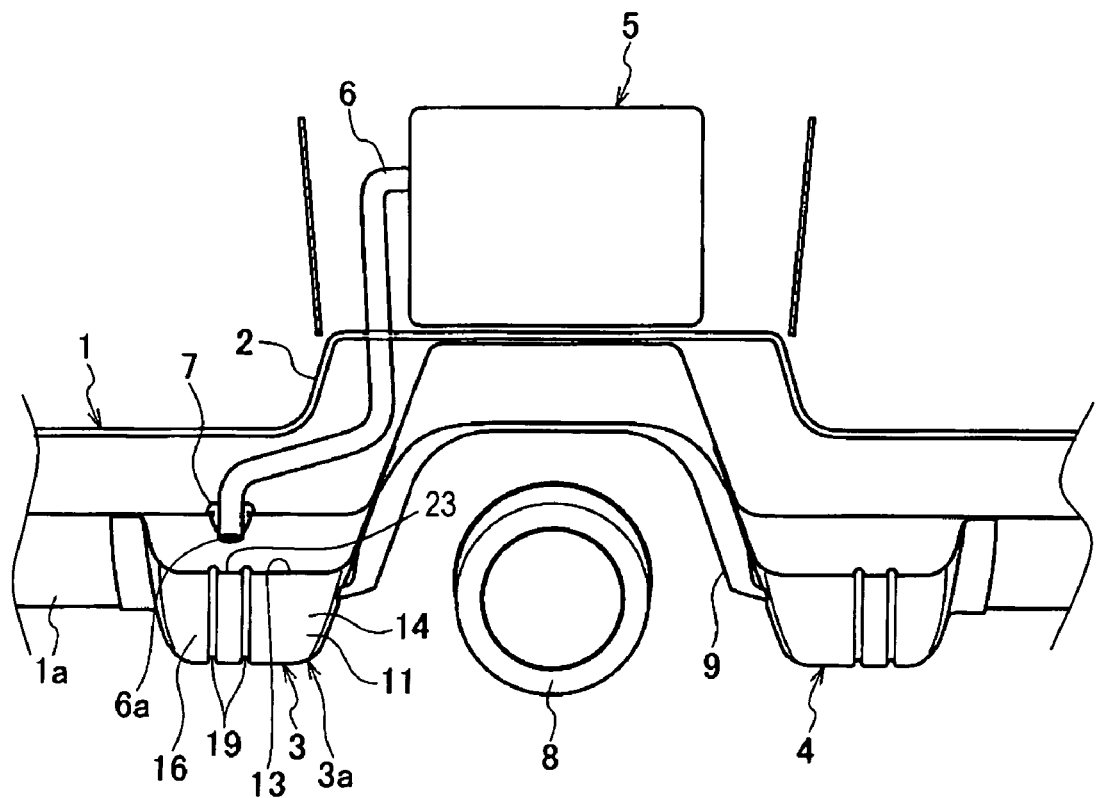
FIG. 3 is a partial frontal cross sectional view of the vehicle water drainage structure taken along a section line 3-3 of FIG. 2 in accordance with the embodiment of the present invention.
Figure 4:
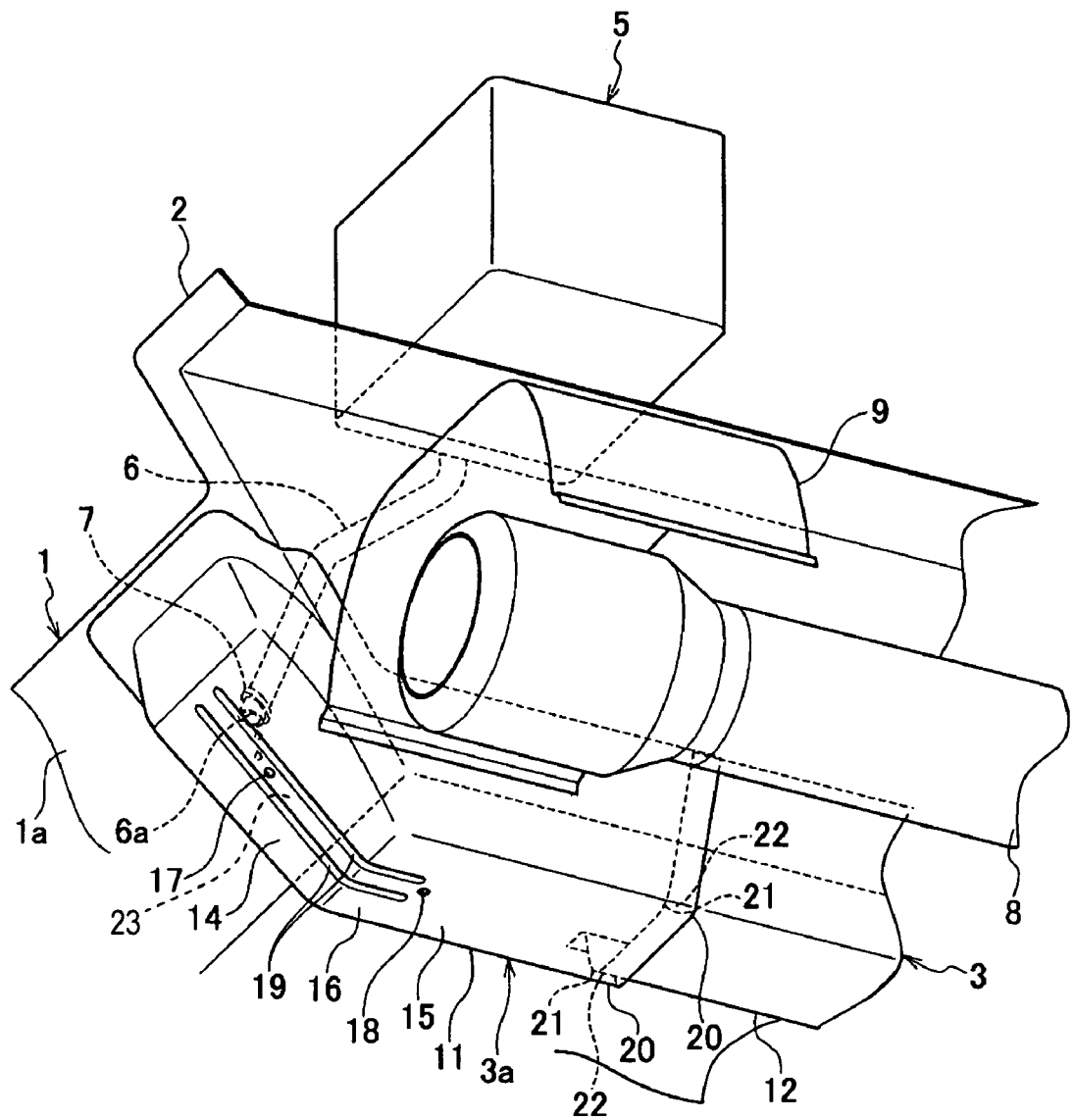
FIG. 4 is a perspective view of the vehicle water drainage structure taken from a position diagonally below and in front of the structure in accordance with the embodiment of the present invention.
Figure 5:
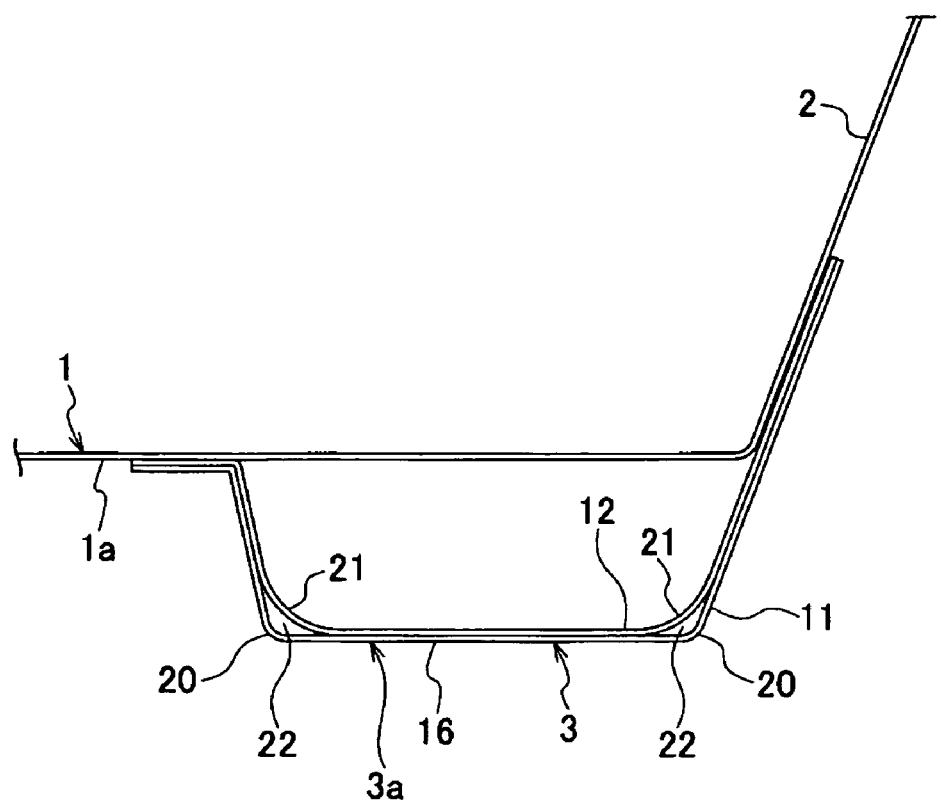
FIG. 5 is a partial frontal cross sectional view showing a mounting structure of a vehicle member taken along a section line 5-5 of FIG. 2 in accordance with the embodiment of the present invention.

Referring initially to FIG. 1, a vehicle water drainage structure is illustrated in accordance with an embodiment of the present invention. FIG. 1 is a perspective view of a vehicle water drainage structure in accordance with this embodiment, which is taken from a position diagonally above and in front of the vehicle water drainage structure. FIG. 2 is a top plan view of the vehicle water drainage structure. FIG. 3 is a frontal cross sectional view of the vehicle water drainage structure taken along a section line 3-3 of FIG. 2. FIG. 4 is a perspective view of the vehicle water drainage structure, which is taken from a position diagonally below and in front of the structure. FIG. 5 is a frontal cross sectional view showing a mounting structure of a vehicle member taken along a section line 5-5 of FIG. 2.

As shown in FIGS. 1 to 4, a floor tunnel 2 that protrudes upward and is open in the downward direction is provided in a transversely middle portion of a floor panel 1 of the vehicle. A pair of vehicle members 3 and 4 arranged to extend in the longitudinal direction of the vehicle are positioned on an under surface 1a of the floor panel 1 on the left and right portions of the floor tunnel 2.

An air conditioner unit 5 (a vehicle device) is installed on top of the floor tunnel 2. The air conditioner unit 5 has a water drainage pipe 6 coupled thereto. A downstream end portion 6a of the water drainage pipe 6 is inserted into an insertion hole 7 formed in the floor panel 1 as seen in FIG.

4. An exhaust system component 8 is arranged inside the floor tunnel 2 on the outside of the vehicle. The exhaust system component 8 is, for example, a catalytic converter. A heat shield plate 9 is provided between the exhaust system component 8 and the floor panel 1.

As shown in FIG. 3, each of the vehicle members 3 and 4 has a generally U-shaped cross sectional shape that is open on the upward side thereof. When the vehicle members 3 and 4 are attached to the floor panel 1, a closed cross sectional structure is formed by each of the vehicle members 3 and 4 and the portion of the floor panel 1 that covers the open side of the U-shaped cross section of the respective vehicle member 3 or 4. The insertion hole 7 is formed in such a position as to open into the inside of the closed cross section formed by the floor panel 1 and the vehicle member 3 as seen in FIG. 3. By being inserted through the insertion hole 7, the downstream end portion 6a of the water drainage pipe 6 communicates with the inside of the closed cross section formed by the floor panel 1 and the vehicle member 3.

Each of the vehicle members 3 and 4 comprises a front section 11 having a generally U-shaped cross sectional shape and a rear section 12 having a generally U-shaped cross sectional shape. A front end portion of the rear section 12 is connected in an overlapping manner to the inside of a rear end portion of the front section 11. In other words, as seen in FIG. 4, the front end portion of the rear section 12 overlaps the rear end portion of the front section 11 in a vertical direction of the vehicle with the rear section 12 being disposed upward of the front section 11.

As shown in FIG. 4, a front portion of each front section 11 is slanted diagonally downward and rearward to form a slanted portion 14. As a result, a portion of a bottom surface 13 of each vehicle member 3 or 4 corresponding to the bottom surface 13 of the front portion of each front section 11 is slanted diagonally downward and rearward. Meanwhile, the portion of each front section 11 located rearward of the slanted portion is generally horizontal to form a horizontal portion 15 and, thus, the corresponding portion of the bottom surface 13 is also generally horizontal. The portion of the bottom surface 13 of each vehicle member 3 and 4 formed by the rear section 12 is also generally horizontal.

As shown in FIG. 4, first and second water drainage openings 17 and 18 arranged along the longitudinal direction of the vehicle are provided in a bottom wall 16 of the front section 11 at positions rearward of the downstream end portion 6a of the water drainage pipe 6. The bottom wall 16 forms part of a bottom portion 3a of the vehicle member 3.

The first water drainage opening 17 is formed in the slanted portion 14 of the front section 11 and the second water drainage opening 18 is formed in a frontward position of the horizontal portion 15 of the front section 11.

A pair of left and right water drainage promotion beads 19 that protrude upward and extend in the longitudinal direction of the vehicle are provided on the bottom surface 13 of the member 3. The pair left and right water drainage promotion beads 19 are arranged to form a groove or channel portion 23 that extends in the longitudinal direction of the vehicle between the drainage promotion beads 19. The first water drainage opening 17 is positioned at the channel portion 23 between the water drainage promotion beads 19 as seen in FIG. 4.

As shown in FIGS. 4 and 5, the radii of curvature of the rear end portion corners 20 (bent parts) of the front section 11 are set to be smaller than the radii of curvature of the front end portion corners 21 (bent parts) of the rearward members 12. As a result, as seen in FIG. 5, gaps (third water drainage openings 22) are formed between the rear end portion corners 20 of the front section 11 and the front end portion corners 21 of the rear section 12. The gaps serve as the third water drainage openings 22 formed in the bottom portion 3a of the vehicle member 3.

The vehicle members 3 and 4 are configured and arranged such that bottommost edge portions thereof are at approximately the same position as or lower than the bottommost edge portion of the exhaust system component 8. The second and third drainage openings 18 and 22 are provided at the bottommost edge portions of the vehicle members 3 and 4 in a vertical direction of the vehicle.

With this structure, drainage water from the air conditioner unit 5 flows out of the downstream end portion 6a of the water drainage pipe 6 into the closed cross sectional structure formed by the floor panel 1 and the vehicle member 3. The water then descends the slanted bottom surface 13 of the vehicle member 3 and flows rearward. As it flows, the drainage water is discharged under the vehicle through the first water drainage opening 17, the second water drainage opening 18, and the third water drainage openings 22. Thus, with this embodiment, since the drainage water from the air conditioner unit 5 is discharged through the first, second, and third water drainage openings 17, 18 and 22, drainage water is prevented from getting on hot components inside the engine compartment. Since the drainage water is discharged below the vehicle from the first, second and third water drainage openings 17, 18 and 22, the discharged drainage water is also prevented from getting on the exhaust system component 8 arranged inside the floor tunnel 2.

Figure 6:
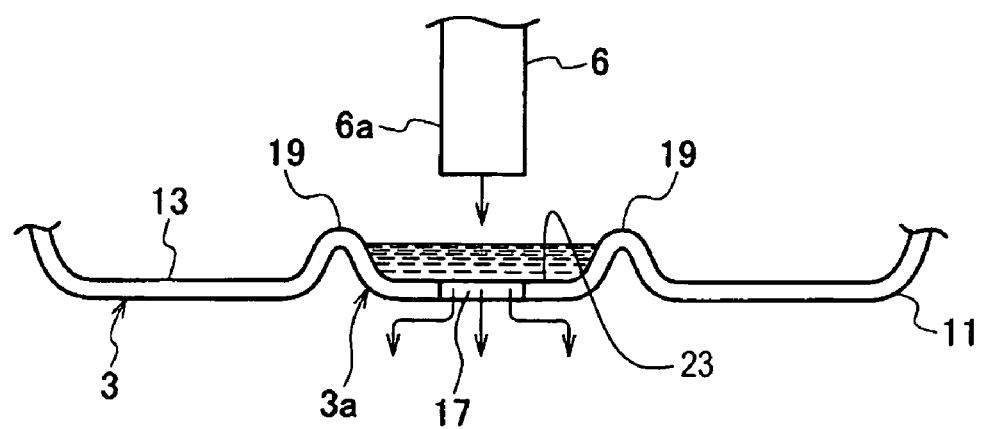
FIG. 6 is a schematic partial cross sectional view illustrating how the drainage water is discharged in the vehicle water drainage structure in accordance with the embodiment of the present invention.

As shown in FIG. 6, the water drainage promotion beads 19 are configured and arranged to restrict the spreading of the drainage water in the widthwise direction of the vehicle and guide the drainage water to the first and second water drainage openings 17 and 18. As a result, the drainage water can be discharged rapidly from the first and second water drainage openings 17 and 18.

Moreover, the back sides (bottom sides) of the water drainage promotion beads 19 are configured and arranged to restrict the widthwise (transverse) spreading of the drainage water discharged from the first water drainage opening 17. As a result, the drainage water discharged from the first water drainage opening 17 can be prevented from dispersing in the widthwise direction of the vehicle and prevented from getting on the exhaust system component 8.

Since this embodiment has the second water drainage opening 18 arranged at the frontward end of the horizontal portion 15 of the front section 11, drainage water that descends the slanted portion of the bottom surface 13 can be discharged smoothly to the outside of the vehicle through the second water drainage opening 18. As a result, the accumulation of drainage water inside the vehicle member 3 can be suppressed, which is advantageous in terms of preventing the vehicle member 3 from corroding.

With this embodiment, drainage water that is not discharged through the first water drainage opening 17 or the second water drainage opening 18 flows toward the portion where the front section 11 and the rear section 12 connect together. Even drainage water that does not flow directly to the third water drainage openings 22 is guided transversely outward in the widthwise direction of the vehicle by the front edge of the rear section 12 and ultimately reaches the third water drainage openings 22. As a result, due to the third water drainage openings 22, drainage water can be reliably discharged to the outside of the vehicle and the accumulation of drainage water inside the vehicle member 3 can be suppressed, which is advantageous in terms of preventing the vehicle member 3 from corroding.

In this embodiment, the vehicle members 3 and 4 are configured and arranged such that bottommost edge portions thereof are at approximately the same position as or lower than the bottommost edge portion of the exhaust system component 8 in the vertical direction of the vehicle. As a result, drainage water discharged to the outside of the vehicle from the bottom portion 3*a* of the vehicle member 3 can be prevented from getting on the exhaust system component 8.

Accordingly, with the present invention, drainage water from the vehicle is discharged from the first, second and third water drainage openings 17, 18 and 22 formed in the bottom portion of the vehicle member 3. As a result, drainage water is prevented from getting on hot components inside the engine compartment of the vehicle and the occurrence of evaporation noise is suppressed.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle water drainage structure comprising:

a vehicle member configured and arranged to form a closed cross sectional structure with a bottom surface of a floor panel of a vehicle when the vehicle member is mounted to the floor panel, the vehicle member including a water drainage opening in a bottom portion thereof; and a water drainage pipe having an upstream end portion coupled to a vehicle device and a downstream end portion passing into inside of the closed cross sectional structure formed by the floor panel and the vehicle member, the water drainage opening of the vehicle member being arranged rearward of the downstream end portion of the water drainage pipe with respect to a longitudinal direction of the vehicle, the downstream end portion of the water drainage pipe being arranged higher than a bottommost edge portion of a vehicle exhaust system component in a vertical direction of the vehicle.

2. The vehicle water drainage structure as recited in claim 1, wherein the vehicle member includes a slanted portion having a bottom surface that is slanted diagonally rearward and downward with respect to the longitudinal direction of the vehicle.

3. The vehicle water drainage structure as recited in claim 1, wherein the vehicle member includes a bottom surface having a channel portion extending along the longitudinal direction of the vehicle.

4. The vehicle water drainage structure as recited in claim 3, wherein the vehicle member includes a pair of water drainage promotion beads that protrude upwardly with respect to the vertical direction of the vehicle and extend in the longitudinal direction of the vehicle on the bottom surface of the vehicle member so that the channel portion is formed between the water drainage promotion beads.

5. The vehicle water drainage structure as recited in claim 1, wherein the vehicle member includes a pair of water drainage promotion beads that protrude upwardly with respect to the vertical direction of the vehicle and extend in the longitudinal direction of the vehicle on the bottom surface of the vehicle member.

6. A vehicle water drainage structure comprising:

a vehicle member configured and arranged to form a closed cross sectional structure with a bottom surface of a floor panel of a vehicle when the vehicle member is mounted to the floor panel, the vehicle member including a water drainage opening in a bottom portion thereof; and a water drainage pipe having an upstream end portion coupled to a vehicle device and a downstream end portion passing into inside of the closed cross sectional structure formed by the floor panel and the vehicle member, the vehicle member including a front section having a generally U-shaped cross sectional shape and a rear section having a generally U-shaped cross sectional shape, the front section and the rear section being coupled together such that a front end portion of the rear section overlaps a rear end portion of the front section in a vertical direction of the vehicle with the rear section being disposed upward of the front section, the front end portion of the rear section and the rear end portion of the front section forming a gap therebetween as the water drainage opening.

7. The vehicle water drainage structure as recited in claim 6, wherein
the front section of the vehicle member includes a bent part that overlaps a bent part of the rear section, the bent part of the front section having a radius of curvature that is smaller than a radius of curvature of the bent part of the rear section so that the gap is provided between the bent part of the front section and the bent part of the rear section to form the water drainage opening.

8. The vehicle water drainage structure as recited in claim 1, wherein
the vehicle member includes a bottommost edge portion arranged at approximately the same position as or lower than the bottommost edge portion of the vehicle exhaust system component in the vertical direction of the vehicle, and the water drainage opening is formed at the bottommost edge portion of the vehicle member.

9. The vehicle water drainage structure as recited in claim 2, wherein
the bottom surface of the slanted portion of the vehicle member includes a channel portion extending along the longitudinal direction of the vehicle.

10. The vehicle water drainage structure as recited in claim 9, wherein
the vehicle member includes a pair of water drainage promotion beads that protrude upwardly with respect to the vertical direction of the vehicle and extend in the longitudinal direction of the vehicle on the bottom surface of the vehicle member so that the channel portion is formed between the water drainage promotion beads.

11. The vehicle water drainage structure as recited in claim 2, wherein
the vehicle member includes a pair of water drainage promotion beads that protrude upwardly with respect to the vertical direction of the vehicle and extend in the longitudinal direction of the vehicle on the bottom surface of the slanted portion of the vehicle member.

12. The vehicle water drainage structure as recited in claim 2, wherein
the vehicle member includes a front section having a generally U-shaped cross sectional shape and a rear section having a generally U-shaped cross sectional shape, the front section and the rear section being coupled together such that a front end portion of the rear section overlaps a rear end portion of the front section in the vertical direction of the vehicle with the rear section being disposed upward of the front section, the front end portion of the rear section and the rear end portion of the front section forming a gap therebetween as the water drainage opening.

13. The vehicle water drainage structure as recited in claim 12, wherein
the front section of the vehicle member includes a bent part that overlaps a bent part of the rear section, the bent part of the front section having a radius of curvature that is smaller than a radius of curvature of the bent part of the rear section so that the gap is provided between the bent part of the front section and the bent part of the rear section to form the water drainage opening.

14. The vehicle water drainage structure as recited in claim 2, wherein
the vehicle member includes a bottommost edge portion arranged at approximately the same position as or lower than the bottommost edge portion of the vehicle exhaust system component in the vertical direction of the vehicle, and the water drainage opening is formed at the bottommost edge portion of the vehicle member.

15. A vehicle water drainage structure comprising:
water draining means for forming a closed cross sectional structure having a water drainage opening under a floor panel of a vehicle; and
water conveying means for conveying water from a vehicle device into the closed cross sectional structure formed by the water draining means and the floor panel,
the water draining opening being arranged rearward of a downstream end of the water conveying means with respect to a longitudinal direction of the vehicle, the downstream end of the water conveying means being arranged higher than a bottommost edge of a vehicle exhaust system component in a vertical direction of the vehicle.

16. The vehicle water drainage structure as recited in claim 6, wherein
the water drainage opening of the vehicle member is arranged rearward of the downstream end portion of the water drainage pipe with respect to a longitudinal direction of the vehicle, and
the vehicle member includes a slanted portion having a bottom surface that is slanted diagonally rearward and downward with respect to the longitudinal direction of the vehicle.

17. The vehicle water drainage structure as recited in claim 7, wherein
the water drainage opening of the vehicle member is arranged rearward of the downstream end portion of the water drainage pipe with respect to a longitudinal direction of the vehicle, and
the vehicle member includes a slanted portion having a bottom surface that is slanted diagonally rearward and downward with respect to the longitudinal direction of the vehicle.

* * * * *